April 7, 1931. J. B. ARMITAGE 1,799,493

OVER ARM CLAMP FOR MACHINE TOOLS

Filed Aug. 7, 1924

INVENTOR
Joseph B. Armitage
BY
Erwin Wheeler & Woolard
ATTORNEY

Patented Apr. 7, 1931

1,799,493

UNITED STATES PATENT OFFICE

JOSEPH B. ARMITAGE, OF MILWAUKEE, WISCONSIN, ASSIGNOR TO KEARNEY & TRECKER CORPORATION, OF WEST ALLIS, WISCONSIN

OVER-ARM CLAMP FOR MACHINE TOOLS

Application filed August 7, 1924. Serial No. 730,602.

This invention relates to improvements in over-arm clamps for machine tools.

It is the object of this invention to provide an over-arm clamp which may be constructed integrally with a machine tool column and may include a portion adapted to be compressed into clamping engagement with an over-arm without flexing the wall of the column.

It will be understood that machine tool columns and, more particularly, the columns of knee and column milling machines are usually made hollow for the purpose of mounting and housing therein the spindle driving gearing and other equipment. It has heretofore been customary to provide in such a column a flexible wall portion adapted to be sprung into engagement with an over-arm carried in suitable bearings adjacent such portion. While there are certain advantages incident to the construction of the clamp integrally with the column structure, it is nevertheless desirable in certain instances to avoid subjecting the column itself to any flexion such as is incident to the clamping of an over-arm.

It is therefore more specifically the object of this invention to provide, in a column having bearings for one or more over-arms, a yieldable bearing wall section connected with the column wall but movable independently thereof; it is further an object of this invention to mount the yieldable bearing wall member interiorly of the column wall and to provide means exteriorly of the column wall for conveniently acting upon said bearing wall section to compress it against the over-arm.

In the drawings:—

Like parts are identified by the same reference characters throughout the several views.

The column 10 is preferably made hollow in accordance with the usual practice and is provided with side walls 11 and a top wall 12. The particular device illustrated is of the double over-arm type and consequently bores extend longitudinally of the column for accommodating parallel over-arms 14 and 15. Two sets of clamps are provided for said over-arms, these clamps being preferably located at the front and rear of the column as indicated in the accompanying drawings.

Within the column there is provided a horizontal web 16 which connects the side walls 11 beneath each of the clamping bearings hereinafter to be described and which may extend from front to rear of the column.

Figure 1:
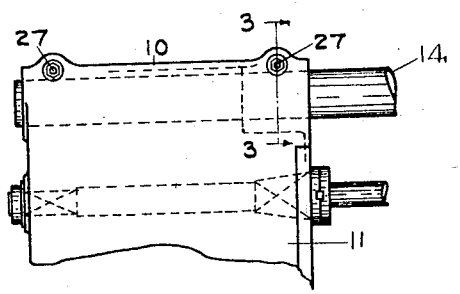
Figure 1 is a side elevation of the upper portion of the column of a key and column milling machine embodying this invention.
Figure 2:
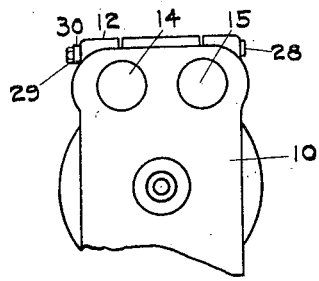
Figure 2 is an end elevation of the parts shown in Figure 1.
Figure 4:
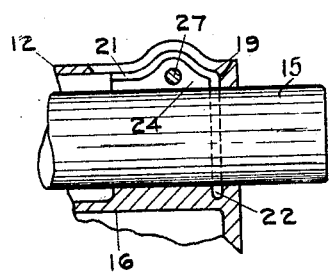
Figure 4 is a detail view taken on the section indicated at 4—4 in Figure 3.
Figure 3:
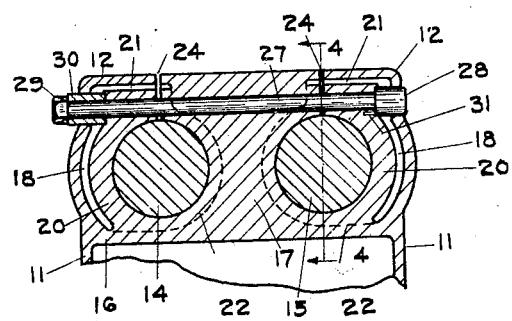
Figure 3 is a detail view on a slightly enlarged scale taken on the section indicated at 3—3 in Figure 1.

Supported upon the web 16 and, through said web, connected integrally with the column is a boss 17 in which the over-arms 14 and 15 find a bearing. The following description of the boss and the bearing clamp at the front of the column will also serve to make clear the construction of the corresponding parts at the rear of the column, the two sets of clamping bearings being preferably identical. Boss 17 is separated laterally from the side walls 11 of the column by narrow channels 18. The side portions 20 of the boss are likewise separated from the top wall 12 of the column by means of channels 21 which communicate with channels 18 and terminate, as indicated in Figure 3, leaving the center of the boss 17 integrally connected with the central portion of the top wall 12 of the column.

The central portion of boss 17 is integrally connected also with the end wall of the column but the side portions of the boss are spaced from the column by channels 22 which communicate both with channels 18 and 21. The inward extent of channel 22 is indicated in dotted lines in Figure 3. The arrangement therefore is such that the central portion of boss 17 comprises a comparatively rigid and immovable block of material integrally connected both below and at one end with the walls of the column, its sides however being wholly disassociated from the column walls.

The side portions 20 of boss 17 are integrally connected with the lower portions of the boss but are each disassociated from the upper portions of the boss by means of slots 24 formed by cutting through the top wall 12 of the column as indicated. It will be noted that the slots 24 intersect the channels 21 and extend centrally into the respective bores of over-arms 14 and 15. Those portions of slots 24 which lie in the wall 12 of the column are of comparatively inconsiderable extent and do not seriously interfere with the rigidity of the column wall.

By means of slots 24 each of the side portions 20 of the boss 17 is rendered yieldable under a compressive force such as may be exerted in the usual way by a bolt 27 headed at 28 for engagement with one of the members 20 and provided with a nut 29 at its other end adapted to act through a sleeve 30 upon the other of the members 20. Suitable openings are provided in the side walls 11 of the column for the head 28 of the bolt and the sleeve 30. Thus the entire clamping effect of the bolt is exerted directly upon the yieldable portions of the boss to spring such portions into clamping engagement with the over-arms. A key at 31 secures the head 28 against rotation relative to one of the yieldable boss elements 20 when the nut 29 is being turned up or unscrewed.

The relatively heavy and unyieldable central portion of boss 17 provides properly aligned surfaces toward which the over-arms 14 and 15 are clamped when the nut 29 is tightened on bolt 27 to spring centrally each of the yieldable boss portions 20. This arrangement is conducive to accuracy and rigidity.

It will be observed that the column as a whole is strengthened in that its walls are not called upon to yield for clamping purposes. The only openings in the column walls are the apertures for sleeves 30 and head 28 and the slots 24 in the top wall 12. These slots, as has already been pointed out, do not extend to the front or rear of the column and consequently are not calculated to weaken materially the strength and rigidity of the column wall.

Figure 5:
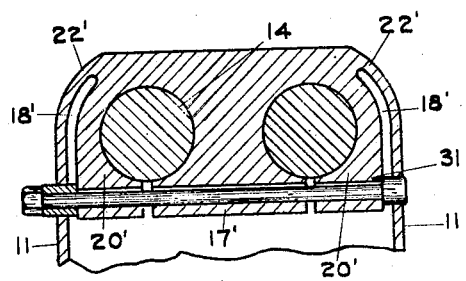
Figure 5 is a view similar to Figure 3 illustrating a slightly modified construction.

The Figure 5 construction illustrates a mere inversion of the parts shown in Figure 3 whereby the channels 21 are rendered unnecessary. The boss 17′ is connected integrally with the top wall 12 of the column and so likewise are the yieldable boss elements 20′. Channels 18′ separate the yieldable boss elements from the side walls 11 of the column in the manner already described and the screw-operated clamping means may be identical with that described above except that it will now be located below the over-arms instead of above the over-arms.

I claim:
1. The combination of a machine tool column having side walls and an over-arm adjustable therein, of a clamping device including over-arm gripping portions integral with said column, one of said portions comprising a relatively immovable wall on one side of said over-arm and positioned between opposite side walls, and another of said portions comprising a relatively flexible member integrally connected with and housed within said column and opposed to said relatively immovable wall, whereby to be adapted to engage the over-arm with said relatively immovable wall.

2. The combination with a machine tool column having side walls and a pair of spaced over-arms adjustable therein, of a clamping device including over-arm gripping portions integral with said column for each of said over-arms and comprising a relatively immovable wall positioned between opposite side walls having a portion between said over-arms and adapted for contact with each, and relatively flexible members each integrally connected with said column and each housed within said column in a position to be opposed to said relatively immovable wall, whereby to be adapted to engage the respective over-arms with said relatively immovable wall upon either side thereof.

3. In a device of the character described, the combination with a hollow column having a bore therethrough and provided internally with a centrally disposed boss having a relatively inflexible wall aligned with said bore, an over-arm adjustable through said bore at one side of said central boss, and a clamping element having a flexible portion housed completely within said column and adjustable centrally toward said boss to a position of clamping engagement with an over-arm in said bore and having another portion connected rigidly and integrally to extend between opposite sides of and to one end of said column, whereby to be adapted to clamp said over-arm against said central boss without distortion of said column.

4. As an article of manufacture, a milling machine column provided with a bore extending therethrough and adapted to receive an over-arm, said bore having an internally housed bearing having different portions, one portion being rigidly integrally connected with a wall of said column, the other portion being flexibly integrally connected with a wall of said column and housed completely within said column to be adjustable independently of the first mentioned portion and the column wall to restrict the opening of said bore, together with means for mechanically springing said other portion to restrict said bore.

5. As an article of manufacture, a milling machine column provided with a bore extending therethrough and adapted to receive an over-arm, said bore having an internally housed bearing having different portions, one portion being rigidly integrally connected with a wall of said column and the other portions being each flexibly integrally connected with a wall of said column and each housed completely within said column to be adjustable independently of the first mentioned portion and the column wall to restrict the opening of said bore, together with means for mechanically springing said other portion in a direction to restrict said bore, said means including a part extending through a wall of said column and being accessible exteriorly thereof.

6. The combination with a hollow machine tool column substantially completely enclosing an interior chamber, of a boss within said chamber, said column being provided with a bore extending through said boss, and an over-arm adjustable within said bore, said boss including relatively fixed and relatively flexible clamping elements each formed integrally with the column interiorly thereof and having surfaces aligned with said bores, said flexible elements being adjustable independently of said column and without distortion thereof to restrict said bore whereby to clampingly engage said over-arm, together with tension means for actuating said flexible element toward said fixed element.

7. In a device of the character described, the combination with a hollow machine tool column, of a boss disposed interiorly of said column and connected integrally therewith, a side portion of said boss being wholly free from said column, and an over-arm adjustable through said column and said boss, a slot being provided extending through the boss in the direction of said over-arm whereby to sever from the remainder of the boss one end of said side portion, whereby to permit said portion to be sprung in the direction of said over-arm independently of said column and of the remainder of said boss.

8. In a device of the character described, the combination with a hollow machine tool column, of a boss disposed interiorly of said column and connected at its central end and top portions integrally therewith, a side portion of said boss being wholly free from said column, and an over-arm adjustable through said column and said boss, a slot being provided extending through the top of said column into said free portion of said boss whereby to permit said boss portion to be sprung in the direction of said over-arm independently of said column and of the remainder of said boss, together with a transverse bolt projecting at its end from said column and provided concentrically with means extending through said column into engagement with the free lateral portion of said boss.

9. In a device of the character described, the combination with a hollow machine tool column provided with spaced over-arm bores, of a boss within said column and including portions encircling said bores, the boss portions at the sides of said portions being housed within said column and spaced therefrom throughout a portion of their peripheral extent, said boss portions being free to move in a direction to restrict said bores.

10. In a device of the character described, the combination with a hollow machine tool column provided with spaced over-arm bores, of a boss within said column and including portions encircling said bores, the boss portions at the sides of said portions being housed within said column and spaced therefrom throughout a portion of their peripheral extent, said boss portions being free to move in a direction to restrict said bores, together with a single clamping means accessible exteriorly of said column and acting upon both of said boss portions whereby to restrict both bores simultaneously.

11. In a device of the character described, the combination with a hollow column, of a boss therein, a pair of over-arms adjustable through said column and said boss, interiorly disposed portions of said boss being free of said column and the remainder of said boss for yielding movement toward said over-arms and in the direction of each other, a clamping bolt extending transversely through said yieldable boss portions, means carried by said bolt for engagement with one of said boss portions, a sleeve axially adjustable on said bolt and extending through the column to a position for engagement with the other of said yieldable boss portions, and means threaded upon said bolt for engagement with said sleeve whereby to exert simultaneously a clamping pressure on both of said over-arms through both of said yieldable boss portions.

JOSEPH B. ARMITAGE.